United States Patent
Neff et al.

(10) Patent No.: US 9,912,531 B2
(45) Date of Patent: Mar. 6, 2018

(54) DATA LOGGING OR STIMULATION IN AUTOMOTIVE ETHERNET NETWORKS USING THE VEHICLE INFRASTRUCTURE

(71) Applicant: Bayerische Motoren Werke Aktiengesellschaft, Munich (DE)

(72) Inventors: Albrecht Neff, Munich (DE); Thomas Koenigseder, Wilfling (DE); Thomas Wuerdinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 522 days.

(21) Appl. No.: 14/541,960

(22) Filed: Nov. 14, 2014

(65) Prior Publication Data

US 2015/0071115 A1    Mar. 12, 2015

Related U.S. Application Data

(63) Continuation of application No. PCT/EP2013/059470, filed on May 7, 2013.

(30) Foreign Application Priority Data

May 16, 2012    (DE) .......................... 10 2012 208 205

(51) Int. Cl.
*H04L 12/50* (2006.01)
*H04L 12/24* (2006.01)
(Continued)

(52) U.S. Cl.
CPC .......... *H04L 41/0803* (2013.01); *H04L 12/40* (2013.01); *H04L 43/12* (2013.01); *H04L 43/50* (2013.01); *H04L 2012/40273* (2013.01)

(58) Field of Classification Search
USPC ................................ 370/386, 362, 364, 366
See application file for complete search history.

(56) References Cited

U.S. PATENT DOCUMENTS 6,879,894 B1    4/2005 Lightner et al.
7,406,050 B2    7/2008 Calluaud et al.
(Continued)

FOREIGN PATENT DOCUMENTS

CN    102007734 A    4/2011
DE    101 47 434 A1    10/2002
(Continued)

OTHER PUBLICATIONS

International Search Report dated Jul. 19, 2013 (Three (3) pages).
(Continued)

*Primary Examiner* — Ricky Ngo
*Assistant Examiner* — Dewanda Samuel
(74) *Attorney, Agent, or Firm* — Crowell & Moring LLP

(57) ABSTRACT

The invention relates to a method and a device for recording data or for transmitting stimulation data, which are transmitted in Ethernet-based networks of vehicles. A method for recording data is described, wherein the data are transmitted from a transmitting control unit to a receiving control unit of a vehicle via a communication system of the vehicle. The communication system comprises an Ethernet network, wherein the data are conducted from a transmission component to a reception component of the Ethernet network via a transmission path, and wherein the data are to be recorded at a logging component of the Ethernet network, which does not lie on the transmission path. The method comprises the configuration of an intermediate component of the Ethernet network, which lies on the transmission path, to transmit a copy of the data as logging data to the logging component; and the recording of the logging data at the logging component.

18 Claims, 2 Drawing Sheets

(51) Int. Cl.
*H04L 12/40* (2006.01)
*H04L 12/26* (2006.01)

(56) References Cited

U.S. PATENT DOCUMENTS

| | | | |
|---|---|---|---|
| 7,983,250 B2* | 7/2011 | Enders | H04L 12/40032 |
| | | | 370/362 |
| 8,095,264 B2* | 1/2012 | Tanigawa | G07C 5/008 |
| | | | 701/115 |
| 2007/0013572 A1 | 1/2007 | Fredriksson | |
| 2007/0081473 A1* | 4/2007 | Jiang | H04L 12/24 |
| | | | 370/254 |
| 2009/0030570 A1* | 1/2009 | Regnard De Lagny | G07C 5/0816 |
| | | | 701/33.4 |
| 2009/0150023 A1 | 6/2009 | Grau et al. | |
| 2010/0052614 A1 | 3/2010 | Mariels | |
| 2010/0204898 A1 | 8/2010 | Wyatt et al. | |
| 2010/0332072 A1* | 12/2010 | Ishiko | B60T 17/221 |
| | | | 701/29.5 |
| 2011/0112717 A1 | 5/2011 | Resner | |
| 2011/0130905 A1 | 6/2011 | Mayer | |
| 2012/0002679 A1 | 1/2012 | Kenigsberg et al. | |
| 2012/0173905 A1* | 7/2012 | Diab | H04L 12/66 |
| | | | 713/320 |
| 2013/0054737 A1* | 2/2013 | Miranda | H04L 43/12 |
| | | | 709/217 |
| 2013/0104186 A1 | 4/2013 | Dietz et al. | |
| 2014/0036693 A1* | 2/2014 | Mabuchi | H04L 43/10 |
| | | | 370/243 |

FOREIGN PATENT DOCUMENTS

| | | |
|---|---|---|
| DE | 101 21 496 A1 | 11/2002 |
| DE | 10 2010 008 816 A1 | 8/2011 |
| EP | 1 583 289 A2 | 10/2005 |
| WO | WO 00/77620 A2 | 12/2000 |

OTHER PUBLICATIONS

German Search Report dated Apr. 23, 2013, with Statement of Relevancy (Six (6) pages).

Kern et al., "Testing Switched Ethernet Networks in Automotive Embedded Systems", Industrial Embedded Systems (SIES), 2011 6th IEEE International Symposium on, IEEE, Jun. 15, 2011 (Jun. 15, 2011), pp. 150-155, XP031893708.

Chinese Office Action issued in Chinese counterpart application No. 201380034970.7 dated Feb. 3, 2017, with English translation (Twenty (23) pages).

* cited by examiner

DATA LOGGING OR STIMULATION IN AUTOMOTIVE ETHERNET NETWORKS USING THE VEHICLE INFRASTRUCTURE

CROSS REFERENCE TO RELATED APPLICATIONS

This application is a continuation of PCT International Application No. PCT/EP2013/059470, filed May 7, 2013, which claims priority under 35 U.S.C. § 119 from German Patent Application No. 10 2012 208 205.0, filed May 16, 2012, the entire disclosures of which are herein expressly incorporated by reference.

BACKGROUND AND SUMMARY OF THE INVENTION

The invention relates to a method and a device for recording data by a control unit of a vehicle and/or for stimulating a control unit of the vehicle on the basis of data, wherein the data are transmitted in an Ethernet-based network of the vehicle.

Typically, bus systems are primarily used in vehicles (in particular in automobiles), in which all data which are exchanged between the nodes of the bus system are available in each case for data logging (i.e., for recording) at every point of the transmission medium, or can be fed in at any arbitrary point of the bus system for stimulation. Examples of such bus systems are, for example, the field bus systems CAN (controller area network) or MOST (media oriented systems transport). The availability of the data of all nodes (i.e., all control units) at any arbitrary point of the bus system inherently enables the use of a central data logger, using which all data can be tapped at any arbitrary point of the bus cable.

With the introduction of Ethernet in automobiles, i.e., with the introduction of a network system which comprises switches (i.e., network switches), the data of the individual control units (CU), which are connected via Ethernet, are only still present on those Ethernet links (i.e., those Ethernet data links or Ethernet cables), which lie on a direct path between the transmitter CU and the receiver CU of the data (or on a direct path between a stimulation unit and a CU to be stimulated). Therefore, data logging of all data in an Ethernet network has heretofore only been possible by installing complex and costly measurement technology on each individual data link of the Ethernet network, which enables the data on the respective data link to be tapped and recorded. Furthermore, currently special measurement technology must be installed to record data about internal states of the control units. These data are typically communicated via special data interfaces ("debug interfaces") of the control units, which are not identical to the vehicle onboard network. In a similar manner, currently special measurement technology must be installed to transmit stimulation data for stimulation to specific control units.

The installation of suitable measurement technology in a vehicle (for example, for error diagnostics during the development of a vehicle or during the maintenance of a vehicle) is complex, since an intervention must be performed in the vehicle (for example, the disconnection of existing lines and/or the laying of additional lines). In addition, an interface which is typically already present cannot be used for data logging and/or for stimulation (for example, the OBD (onboard diagnosis) interface of the vehicle) if the data traffic must be tapped or fed in via special measurement technology.

The present invention addresses the above-described technical problems in the recording of CU data or in the transmission of stimulation data to a CU in automotive Ethernet networks. In particular, the present document describes a method which enables, without the use of additional measurement technology, complete data logging of all CU data in the vehicle to be carried out and/or stimulation data to be transmitted to all CUs of a vehicle.

According to one aspect, a method for recording data is described. The data to be recorded are transmitted from a transmitting control unit to a receiving control unit of a vehicle via a communication system of the vehicle. The vehicle can be, for example, a motor vehicle or an automobile. The communication system of the vehicle comprises an Ethernet network. In addition, the communication system can also comprise further bus systems, for example, a CAN (controller area network), MOST (media oriented systems transport), LIN (local interconnect network), and/or FlexRay bus system. The various bus systems and the Ethernet network can be connected to one another via one or more bridge components (for example, one or more control units). For example, the various bus systems and the Ethernet network can be connected to one another via a central gateway. The one or more bridge components and/or the central gateway thus enable an exchange of data between the components connected to the various bus systems and to the Ethernet network (e.g., sensors, actuators, and/or control units).

The data to be recorded are conducted from a transmission component to a reception component of the Ethernet network via a transmission path. The data to be recorded typically have the form of Ethernet data (i.e., Ethernet packets or Ethernet frames), which comprise header data and useful data. In this case, the transmission component can comprise the transmitting control unit or the transmission component can be the transmitting control unit. In a similar manner, the reception component can comprise the receiving control unit, or the reception component can be the receiving control unit. On the other hand, the transmission component could also be a bridge component or the central gateway, which receives the data to be recorded via another bus system from the transmitting control unit and transmits them as Ethernet data in the Ethernet network. In a similar manner, the reception component can be a bridge component or the central gateway, which receives the data to be recorded as Ethernet data via the Ethernet network and relays them via another bus system to the receiving control unit.

The data to be recorded are to be recorded at a logging component of the Ethernet network, which does not lie on the transmission path. The Ethernet network is typically configured such that the data to be recorded only occur at components which lie on the transmission path between the transmission component and the reception component. The data to be recorded are generally not available at components which do not lie on the transmission path. This is because, for example, some or all components of the Ethernet network comprise respectively corresponding Ethernet switches, which enable targeted guidance of the data to be recorded from the transmission component to the reception component through the Ethernet network.

The method comprises the configuration of an intermediate component of the Ethernet network, which lies on the transmission path, to transmit a copy of the data as logging data to the logging component. In one exemplary embodiment, the intermediate component comprises an Ethernet switch (also called layer 2 switch). The configuration of the intermediate component can comprise the configuration of the Ethernet switch, to prepare a copy of the data to be recorded. Furthermore, the configuration of the intermediate component can comprise the configuration of the Ethernet switch to provide the copy of the data with header data, which enable the transmission of the copy of the data through the Ethernet network to the logging component. The copy of the data can be prepared, for example, on the basis of a port mirroring function of the Ethernet switch. The header data can comprise one or more of the following, for example: a MAC target address of the logging component and/or a VLAN tag, which identifies the copy of the data as logging data.

The method can furthermore comprise the recording of the logging data at the logging component. The logging component can be, for example, part of an information and communication system (also called head unit) of the vehicle. The information and communication system of the vehicle can comprise an internal storage medium (for example, a hard drive and/or a RAM memory). Alternatively or additionally, the information and communication system of the vehicle can comprise an interface (for example, a USB interface) for connecting an external storage medium (for example, a USB stick). The logging data can then be recorded on an (external or internal) storage medium of the information and communication system. The costly use of dedicated data loggers can thus be avoided. Instead, the storage medium of the information and communication system can be used as a data logger. The logging component can furthermore comprise a UMTS or a WLAN interface. The logging data can then be transmitted via the UMTS or the WLAN interface to a data logger. Prompt recording and analysis of logging data in operation of the vehicle are thus enabled.

The method can furthermore comprise the configuration of one or more further components of the Ethernet network, which lie on a logging transmission path from the intermediate component to the logging component. The one or more further components can be configured to transmit the logging data to the logging component. In other words, not only the diverting intermediate component but rather also further components of the network can be configured to transmit the logging data to the logging component. The one or more further components can each comprise an Ethernet switch for this purpose.

The method can furthermore comprise the configuration of the Ethernet switch of the intermediate component, to transmit the logging data via a determined (first) port of the Ethernet switch to the logging component. Furthermore, the method can comprise the configuration of the Ethernet switch of the intermediate component to reserve a predetermined transmission bandwidth of the determined (first) port for the transmission of the logging data. A side channel which originates from the intermediate component can thus be configured for logging data having a predetermined transmission bandwidth, which limits the quantity of logging data to the predetermined transmission bandwidth. By the configuration of such a side channel, it can be ensured that the operational data traffic in the Ethernet network is not interfered with by the transmission of the additional logging data.

The method can furthermore comprise the configuration of the intermediate component to store or transmit an error message if the logging data cannot be transmitted to the logging component. The intermediate component can recognize, for example, that the logging data to be transmitted exceed the predetermined transmission bandwidth of the side channel and thereupon discard individual items of the logging data. To be able to recognize the discarding of logging data, the intermediate component can store or transmit an error message, so that the absence of logging data can be noted on the data logger.

The configuration of the intermediate component can comprise the transmission of a configuration command to the intermediate component through the Ethernet network. In particular, the Ethernet switch of the intermediate component can be configured by the configuration command. The configuration command can be a UDS (universal diagnostics services) diagnostic command, for example, according to the ISO 14229:1998 standard. The configuration command can be transmitted, for example, from a data logger via an OBD (onboard diagnostics) interface of the vehicle; and/or can be transmitted from a data logger via a WLAN or a UMTS interface of the vehicle; and/or can be transmitted from a storage medium of an information and communication system of the vehicle. In summary, the configuration command can be transmitted via the Ethernet network to the intermediate component, which enables flexible and cost-effective adaptation of the Ethernet network to the respective data to be recorded. It is to be noted that the configuration command can be transmitted to the intermediate component via another automotive bus system (for example, a CAN, MOST, FlexRay, or LIN bus system) if the intermediate component is (also) connected to another automotive bus system.

The method can comprise ascertaining a logging scenario from a variety of predefined logging scenarios. Each of the predefined logging scenarios can, for example, identify at least one component of the Ethernet network as a logging component (multiple logging components are also possible, for example, to reduce the volume of traffic due to the additional logging data). Furthermore, a predefined logging scenario can identify one or more transmitting control units and/or one or more receiving control units, the exchanged data of which are to be recorded. In addition, a predefined logging scenario can specify configuration parameters for one or more intermediate components for configuring the one or more intermediate components. The configuration parameters can, for example, define a data channel (also called side channel), which is reserved for the logging data, through the Ethernet network having a predetermined transmission bandwidth. The logging scenarios can be determined on the basis of the topology of the Ethernet network and/or on the basis of the operational data streams through the Ethernet network. It can thus be ensured by the use of predefined logging scenarios that the additional logging traffic does not disturb the operational data streams of the vehicle.

The method can furthermore comprise the detection of a predefined state of the vehicle. For example, a determined error state can be detected. The detection of this state can be performed, for example, by a control unit of the vehicle or by a vehicle-external device. For example, a determined error state can be ascertained on the basis of an error memory entry in a control unit. The ascertainment of the logging scenario can then be performed on the basis of the detected state of the vehicle. It can thus be ensured that (only the) logging data relevant for the state of the vehicle are recorded. In addition, the additional data traffic which is caused by the logging data can be reduced by a state-dependent selection of logging scenarios.

As already described above, the transmitting control unit can be connected to a different bus system of the communication system than the Ethernet network. In this case, the transmission component can be configured to receive all (or a selection) of the data transmitted by the transmitting control unit via the other bus system. The method can then further comprise the configuration of the transmission component to transmit a copy of at least a part (or all) of the data transmitted from the transmitting control unit via the other bus system to the logging component. In other words, the transmission component can be configured to tunnel all or a part of the data received from the transmitting control unit through the Ethernet network. The part to be copied of the data transmitted from the transmitting control unit via the other bus system can be specified in a logging scenario, for example.

The method can furthermore comprise the transmission of a control unit configuration command to the transmitting control unit (or to another control unit of the vehicle). The control unit configuration command can be transmitted, for example, in the form of a UDS command to the control unit. The method can furthermore comprise the configuration of the transmitting control unit (or another control unit of the vehicle), on the basis of the control unit configuration command, to transmit items of internal status information of the transmitting control unit as status data. The status data can be transmitted, for example, on the bus system of the control unit. Furthermore, the method can further comprise the configuration of the transmission component (and/or another component of the Ethernet network) to transmit the status data to the logging component. It is thus possible to also record items of internal status information of the control unit via the Ethernet network at a specific logging component. In particular, dedicated debugging interfaces (and therefore costs) can thus be avoided on the control units.

According to a further aspect, a method for transmitting stimulation data via the communication system of the vehicle to a receiving control unit of the vehicle is described. The stimulation data are to be transmitted such that the receiving control unit evaluates the stimulation data as data which were transmitted from a transmitting control unit of the vehicle. As already described above, the communication system comprises an Ethernet network. The Ethernet network is designed such that defined data from the transmitting control unit to the receiving control unit are conducted from a transmission component to a reception component of the Ethernet network via a transmission path. On the other hand, the stimulation data are transmitted from a stimulation component which does not lie on the transmission path.

The method comprises the configuration of an intermediate component of the Ethernet network, which lies on the transmission path, to modify header data of the stimulation data received from the stimulation component. The intermediate component can be, for example, the last component of the Ethernet network on the transmission path before the reception component, i.e., the original header data can be used for the purpose of conducting the stimulation data from the stimulation component up to the intermediate component through the Ethernet network. At the intermediate component, these original header data are then modified such that they are evaluated by the reception component as data which were transmitted from the transmitting control unit and/or from the transmission component. The modification of the header data can comprise, for example, removing a VLAN tag, which identifies the received stimulation data as stimulation data. Alternatively or additionally, the modification of the header data can comprise, for example, replacing a MAC origin address with the MAC address of the transmission component.

In addition, the intermediate component can be configured such that the intermediate component transmits the modified stimulation data to the reception component. As already described above, the intermediate component can comprise an Ethernet switch. The configuration of the intermediate component can then comprise the configuration of the Ethernet switch to modify the header data of the stimulation data and transmit the modified stimulation data to the reception component.

The method can furthermore comprise the configuration of the intermediate component to conduct data transmitted from the transmitting control unit to a logging component. Furthermore, the intermediate component can be configured to replace the data transmitted from the transmitting control unit by the stimulation data. In other words, the intermediate component can "capture" the data transmitted from the transmitting control unit and relay them to the logging component. The captured data can be replaced by stimulation data, which are then relayed instead of the data transmitted by the transmitting control unit to the receiving component and to the receiving control unit.

The method can furthermore comprise the configuration of one or more further components of the Ethernet network, which lie on a stimulation transmission path from the stimulation component to the intermediate component. The one or more further components can be configured to transmit the stimulation data to the intermediate component. In other words, not only the intermediate component, but rather also further components of the network can be configured to transmit the stimulation data from the stimulation component to the intermediate component. For this purpose, the one or more further components can each comprise an Ethernet switch.

Furthermore, the method can comprise the configuration of the Ethernet switch of the intermediate component to reserve a predefined transmission bandwidth of a determined (first) port of the Ethernet switch of the intermediate component for the reception of the stimulation data. This also applies for the further components of the network on the transmission path between stimulation component and intermediate component. Side channels for stimulation data having a predefined transmission bandwidth can thus be configured, which limits the quantity of stimulation data to the predefined transmission bandwidth. By way of the configuration of such a side channel, it can be ensured that the operational data traffic in the Ethernet network is not disturbed by the transmission of the additional stimulation data.

In one exemplary embodiment, the logging component and the stimulation component are a shared component of the Ethernet network. In addition, a data logger (which records the logging data) and a stimulation unit (which generates the stimulation data) can be implemented as a shared unit (for example, a shared computer). On the other hand, a plurality of data loggers and/or a plurality of stimulation units can also be used. In particular, the use of a plurality of logging components and/or a plurality of stimulation components in the network can be advantageous to reduce the load due to the logging data and/or the stimulation data.

In a similar manner as for the purpose of the recording, the intermediate component can be configured for the purpose of the transmission of stimulation data by one or more configuration commands. In other words, the configuration of the intermediate component can comprise the transmission of a configuration command to the intermediate component through the Ethernet network (or another bus system). In particular, the Ethernet switch of the intermediate component can be configured by the configuration command. The configuration command can be a UDS (universal diagnostics services) diagnostic command, for example, according to the ISO 14229:1998 standard. The configuration command can be transmitted, for example, from a stimulation unit via an OBD (onboard diagnostics) interface of the vehicle; and/or from a stimulation unit via a wireless interface (WLAN, UMTS, GPRS, EDGE, LTE, Bluetooth) of the vehicle; and/or can be transmitted from a storage medium of an information and communication system of the vehicle. In summary, the configuration command can be transmitted via the Ethernet network to the intermediate component, which enables flexible and cost-effective adaptation of the Ethernet network to the respective stimulation data to be transmitted.

The method can furthermore comprise carrying out an access control. In particular the connection of a data logger or a stimulation unit to the OBD Ethernet interface or to a wireless interface or to another interface can be controlled by a protective mechanism, so that the data communication via these interfaces (for example, the reception of logging data and/or the transmission of logging data) is first enabled when a particular pinning is used in the OBD plug; and/or when a particular authentication/legitimization (for example, by cryptographic methods) has been carried out. This can be performed, for example, via diagnosis of ISO 14229 diagnostic commands and/or authentication according to VPN (virtual private network) connections, etc. In other words, the method can comprise checking and authentication of a transmitter (for example, of a data logger or a stimulation unit) of a configuration command. The transmission of the configuration command to an intermediate component can be made dependent on whether the authentication was successful.

Alternatively or additionally, the connection of a data logger or a stimulation unit to the OBD Ethernet interface or to a wireless interface or to another interface can be controlled by a protective mechanism, so that the data communication via these interfaces (for example, the reception of logging data and/or the transmission of stimulation data) is first enabled when the respective interface, at the point of time of the data communication with the data logger and/or with the stimulation unit, is not connected to determined data networks—networks (which can be disturbed in particular by such logging data and/or stimulation data). This control mechanism can be implemented in particular in that the control unit of the vehicle housing the interface transmits defined Ethernet or IP messages to individual defined network addresses or as a broadcast in the communication network of the vehicle to find out whether determined services are offered in the network (for example, DHCP service). Depending on which network services are discovered, the communication is or is not enabled. The above-described control mechanism can also be implemented in that the control unit of the vehicle housing the interface transmits determined Ethernet or IP messages to individual addresses or as a broadcast in the communication network of the vehicle, to find out whether further Ethernet switches or routers are present in the network (for example, "trace route" commands or messages, which are not relayed by switches). The communication is or is not enabled in dependence thereon.

The above-mentioned protective mechanisms can be implemented, for example, in the component of the network by which the respective interface for the data logger and/or for the stimulation unit is provided. In addition, a part of the protective mechanism (for example, as a client) can be implemented in the data logger or in the stimulation unit. In particular, the data logger or the stimulation unit can be configured to respond to defined messages transmitted by the control unit housing the interface. Furthermore, the data logger or the stimulation unit can be configured additionally or exclusively to transmit corresponding messages in the network, to thus check the presence of a secure network environment.

It is to be noted that instead of the control unit housing the interface, other components installed in the vehicle can carry out the above-mentioned communication for the access control, to thus ascertain the enabling of the protective mechanism.

The stimulation component can be part of an information and communication system (also called head unit) of the vehicle. The stimulation data can be stored on an (external or internal) storage medium of the information and communication system, and be transmitted therefrom. The costly use of dedicated stimulation units can thus be avoided. The stimulation component can also comprise a wireless interface (for example, UMTS or a WLAN). The stimulation data can then be transmitted via the wireless interface from a stimulation unit to the vehicle. Prompt transmission of stimulation data in operation of the vehicle is thus enabled.

The method can comprise the ascertainment of a stimulation scenario from a plurality of predefined stimulation scenarios. Each of the predefined stimulation scenarios can, for example, identify at least one component of the Ethernet network as a stimulation component (multiple stimulation components are also possible, for example, to reduce the volume of traffic due to the additional stimulation data). Furthermore, a predefined stimulation scenario can identify one or more transmitting control units and/or one or more receiving control units, into the transmission path of which stimulation data are to be fed. In addition, a predefined stimulation scenario can specify configuration parameters for one or more intermediate components for configuring the one or more intermediate components. The configuration parameters can define, for example, a data channel (also called side channel), which is reserved for the stimulation data, through the Ethernet network having a predetermined transmission bandwidth. The stimulation scenarios can be determined on the basis of the topology of the Ethernet network and/or on the basis of the operational data streams through the Ethernet network. It can be ensured by the use of predefined stimulation scenarios that the additional stimulation traffic does not interfere with the operational data streams of the vehicle.

It is to be noted that combined logging/stimulation scenarios can also be defined. The methods described in this document can therefore comprise the algorithmic ascertainment of a logging and/or stimulation scenario from a plurality of predefined framework parameters. The framework parameters can comprise at least one component of the Ethernet network, which is identified as a logging and/or stimulation component; one or more transmitting control units and one or more receiving components, the exchanged data of which are to be recorded, and/or one or more receiving CUs, to which the stimulation data are to be transmitted from the stimulation component (instead of from one or more transmitting CUs); message types of which the exchanged data are composed; header data, on the basis of which the logging data and/or the stimulation data are selected or identified. In the scenarios, the configuration parameters for one or more intermediate components can be specified for the configuration of the one or more intermediate components. Furthermore, on the basis of the selection of a determined scenario, the above-mentioned configuration commands can be prepared by machine for one or more intermediate components.

An algorithm can be provided for ascertaining the configuration commands for the one or more intermediate components. This algorithm can, for example, ascertain the bandwidths required for the logging and/or the stimulation on the respective data lines of the communication network of the vehicle and compare them to the respectively available bandwidths on the respective data lines and prepare the most suitable possible configuration based thereon, or provide feedback that a corresponding configuration is not possible in consideration of the required and available bandwidths, or suggest discarding a determined data traffic to bring the required and available bandwidths into harmony.

The method can furthermore comprise offering a possibility for the selection of a predefined logging/stimulation scenario from a set of the above-mentioned framework parameters of predefined logging/stimulation scenarios.

The method can furthermore comprise the placement of an SW module on the intermediate components of the network, which transmit data in the Ethernet network. These SW modules can be configured to transmit items of information to a higher-order unit, wherein the higher-order unit ascertains the above-mentioned configuration commands. In particular, the respective SW modules can provide items of information about which MAC addresses of other components of the network are reachable via the various ports of the intermediate component (i.e., items of topology information). The higher-order unit can prepare a vehicle-wide layer 2 Ethernet network topology on the basis of these items of information, to be able to establish a configuration of the intermediate components in the network.

Furthermore, an SW module can be placed on the intermediate components of the network, which configures the intermediate component to interpret, understand, and execute configuration commands prepared by the higher-order unit. The above-mentioned SW modules can be selectively updated, for example, in the scope of an SW update process of the vehicle or of the housing control unit.

The higher-order unit, which ascertains the configuration commands, can have a direct or indirect database connection, which can provide the following topology knowledge, for example, to the higher-order unit for calculating the configuration commands:

topology of the network link (i.e., in particular items of information about which data line is connected to which terminal of the intermediate components of the network); and/or control units and the placement thereof in the network; and/or message types which are transmitted in the network; and/or items of information about which message type is transmitted with which header data (for example, VLAN, ether type, protocol) from which transmitting CU to which receiving control unit; and/or non-Ethernet networks (i.e., other bus systems) and the linkage points thereof (gateways) with the Ethernet network; and/or message types on the non-Ethernet networks (i.e., on other bus systems); and/or control units and the placement thereof in the non-Ethernet networks; and/or items of information about which message type is transmitted with which header data from which transmitting CU to which receiving control unit in the non-Ethernet networks; and/or possible connection points for data loggers and/or stimulation units; and/or bandwidths available for logging and/or stimulation per transmission line; and/or occupied bandwidth per transmission line and/or per message type.

The higher-order unit, which ascertains the configuration commands, can be configured to execute, itself and/or with the aid of other units, a network topology discovery by transmitting network messages (for example, trace route commands, ping commands, other suitable messages), to thus ascertain the structure of the network (placement of the links and intermediate components in the Ethernet network) and also position, MAC addresses, and IP addresses of the control units.

The higher-order unit can be configured to transmit the ascertained configuration commands automatically to all relevant intermediate components and/or control units. Alternatively or additionally, the higher-order unit can be configured to generate a configuration file or a processing script, which can be used for configuration of the intermediate components and/or the control units.

The method can furthermore comprise the configuration (for example, on the basis of configuration commands) to discard determined application or operational data traffic (for example, selectively according to transmitting CU, receiving CU, message type, etc.). It can be ascertained, for example, in the scope of a logging/stimulation scenario that additional bandwidth is required for the logging and/or stimulation data on determined data lines. This additional bandwidth can be provided by the above-mentioned configuration of one or more intermediate components. In a similar manner, one or more transmitting control units can be configured (by configuration commands) for the targeted muting of one or more message types, to provide the required bandwidth for the stimulation and/or logging data.

The method can furthermore comprise the activation ("waking up") of one or more intermediate components in the Ethernet network. Intermediate components can be deactivated in determined partial network operating states of the vehicle (nonfunctional standby mode). If such intermediate components are required for the diversion/transmission of logging data and/or the feeding in/transmission of stimulation data, however (for example, to transport the data to the logging component or from the stimulation component), the intermediate components can be activated (for example, on the basis of a corresponding configuration command). The activation can be triggered, for example, via ISO 14229 diagnostic commands either directly in the component located in the standby mode or via third components. Alternatively or additionally, the activation can be triggered via control unit configuration commands, which can be ascertained by the higher-order unit, for example.

In a similar manner, the method can further comprise the "keeping active" ("keeping awake") of one or more intermediate components in the Ethernet network. This is to prevent the intermediate components from being deactivated, although they would otherwise fall into a standby mode because of the partial network operation provided in the vehicle ("sleeping of the control units"). The "keeping active" can be triggered, for example, via ISO 14229 diagnostic commands either directly in the component threatened by the standby mode or via third components. Alternatively or additionally, the "keeping active" can be triggered via control unit configuration commands, which can be ascertained by the higher-order unit, for example.

The method can also comprise the disconnection of an Ethernet line, for example, to loop a data logger and/or a stimulation unit into the disconnected line.

The configuration of the intermediate components and/or the control units can (optionally) be carried out persistently (i.e., beyond a restart of the components/the CUs) or in a volatile manner. In addition, the configuration of the intermediate components and/or the control units can (optionally) be performed with immediate effect or only upon the next restart of the vehicle or the components/CUs.

As described above, the access to the communication system of the vehicle for logging/stimulation can be secured by protective mechanisms. In a similar manner, the configuration of the control units and/or the intermediate components can also be secured by authentication measures (for example, by ISO 14229 diagnostic commands).

At the point in time of the switchover of a configuration in the intermediate components, special actions can be triggered in the vehicle. In particular, short-term communication disturbances in the intermediate components are to be expected, if they are switched over in running operation. Such disturbances can be compensated for, for example, by the following measures: The suppression of error reactions (in particular the suppression of automotive error memory entries) at the point in time of the switchover of the configuration, to ignore the message failures to be expected at the switchover point in time (which are typically entered in the error memories) in the intermediate components. A further measure is the transmission of a message to all communication partners (control units), which informs them about the imminent switchover of the intermediate components and therefore advises of the imminent communication failures.

As already described above, the method can furthermore comprise the detection of a predefined state of the vehicle. The ascertainment of the stimulation scenario can then be performed on the basis of the detected state of the vehicle. It can thus be ensured that (only the) stimulation data relevant for the state of the vehicle are transmitted. In addition, the additional data traffic caused by the stimulation data can be reduced by a state-dependent selection of stimulation scenarios.

As already described above, the receiving control unit can be connected to a different bus system of the communication system than the Ethernet network. The reception component can be configured to transmit data from the Ethernet network to the receiving control unit via the other bus system. The method can furthermore comprise the configuration of the reception component to transmit the stimulation data (or parts thereof) received from the stimulation component via the other bus system to the receiving CU. The part of the stimulation data which are to be transmitted to the receiving control unit via the other bus system can be specified in a stimulation scenario.

According to a further aspect, an Ethernet network for a vehicle is described, which has been configured according to the method described in this document (for example, the method for recording data at a logging component of the Ethernet network and/or the method for transmitting stimulation data from a stimulation component).

According to a further aspect, a software (SW) program is described. The SW program can be configured to be executed on a processor and to thus execute the method described in this document.

According to a further aspect, a storage medium is described. The storage medium can comprise a SW program, which is configured to be executed on a processor, and to thus execute the method described in this document.

It is to be noted that the methods, devices, and systems described in this document can be used both alone and also in combination with other methods, devices, and systems described in this document. Furthermore, any aspects of the methods, devices, and systems described in this document can be combined with one another in manifold ways. In particular, the features of the claims can be combined with one another in manifold ways.

The invention is described in greater detail hereafter on the basis of exemplary embodiments. In the figures:

Other objects, advantages and novel features of the present invention will become apparent from the following detailed description of one or more preferred embodiments when considered in conjunction with the accompanying drawings.

DETAILED DESCRIPTION OF THE DRAWINGS

The present invention is not restricted to the exemplary embodiments shown. In particular, it is to be noted that the description and the figures are only to illustrate the principle of the proposed methods, devices, and systems.

Figure 1:
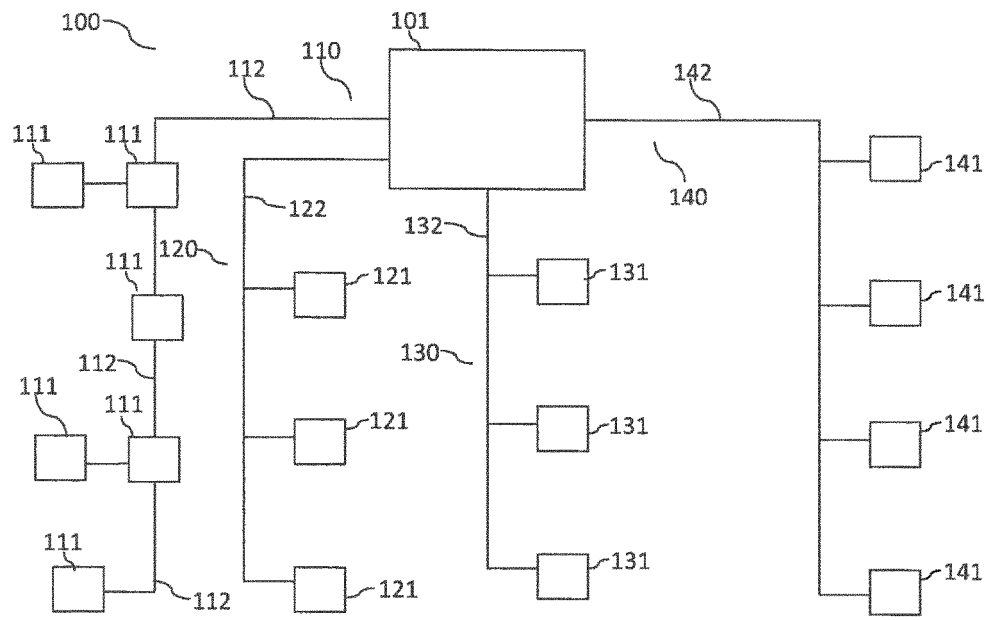
FIG. 1 shows an exemplary communication system of a vehicle having a plurality of different bus systems.

FIG. 1 shows an exemplary communication system 100 for a vehicle (for example, a motor vehicle or automobile). The system 100 comprises a central gateway 101, to which various bus systems 120, 130, 140 are connected. The bus system 120 is, for example, a synchronous FlexRay bus system. In addition, the bus system 130 is, for example, an asynchronous CAN (controller area network) bus system, while the bus system 140 is, for example, a synchronous MOST (media oriented systems transport) bus system. Different components of the vehicle (e.g., sensors, actuators, and/or control units (electronic control units, ECU)) are connected to the respective bus systems. Thus, the components 121 are connected to the bus 122 of the bus system 120, the components 131 are connected to the bus 132 of the bus system 130, and the components 141 are connected to the bus 142 of the bus system 140.

The components can put data as a transmitter on the bus or take data as a receiver from the bus, respectively, according to the protocol of the respective bus system. As shown in FIG. 1, in the case of the FlexRay bus system 120, the CAN bus system 130 and the MOST bus system 140, in each case a shared bus 122, 132, 142 is used, the transmission capacity of which must be shared by all components 121, 131, 141, which are connected to the bus 122, 132, 142. This has the disadvantage that the transmission capacity available for each individual component 121, 131, 141 is reduced with increasing number of components 121, 131, 141. On the other hand, the data exchanged between the components 121, 131, 141 of a respective bus 122, 132, 142 can be tapped at any arbitrary point of the bus 122, 132, 142 (for example, also at the central gateway 101).

An Ethernet network 110 is also connected to the gateway 101. The Ethernet network 110 also comprises a plurality of components 111, which are connected to one another via buses 112. In the case of the Ethernet network 110, some or all of the components 111 usually comprise, however, switches, which enable it to guide data in a targeted manner from a transmitting component 111 to a receiving component 111, so that these data are usually not all transmitted on all buses 112, but rather only on buses 112 which lie on the transmission path between the transmitting component 111 and the receiving component 111. The use of switches results in an increase of the transmission capacity available for each individual component 111. On the other hand, the data transmitted in the Ethernet network 110 cannot be tapped at any arbitrary point of the network 110. In particular, it cannot be ensured that all data can be tapped at the central gateway 101.

As already described in the introduction, additional measurement technology could be installed in the vehicle for data logging. However, this results in a plurality of disadvantages: Due to the installation of measurement technology in each Ethernet bus (or Ethernet link) 111 of the automotive Ethernet network 110, high costs are caused for the measurement technology itself and for the complex installation thereof in each Ethernet link 111. In addition, if measurement technology is used, the existing interfaces usually cannot be used for data logging (for example, the OBD interface), which causes further costs and effort (for example, installation and access to the wiring harness of the vehicle). In addition, additional measurement technology for internal CU states at debug interfaces of the CUs causes costs in the control units (provision of a debug interface for the control unit), and also costs with respect to logging hardware and the installation thereof in experimental vehicles. Furthermore, the data traffic on the Ethernet data links 111 to be measured is influenced by the measurement technology with regard to the time behavior of the data traffic. In addition, for technical reasons, for example, a lack of installation space or required EMC (electromagnetic compatibility), the introduction of measurement technology can be entirely impossible on determined Ethernet links 111 of the Ethernet network 110, so that data which are only available on this link and no other link 111 cannot be recorded. The traffic present on these links 111 is therefore not visible in the logging recordings. Finally, mass-produced vehicles (for example, in the factory or during maintenance) usually cannot be modified with acceptable expenditure to be able to log all data, so that comprehensive data logging is usually not possible in Ethernet networks 110.

In consideration of the above-mentioned disadvantages upon the use of specific measurement technology for data logging in a vehicle, the present document describes a method which uses the existing vehicle infrastructure for data logging, so that in general no modifications are necessary on the vehicle and nonetheless all relevant data of the automotive Ethernet network 110 can be recorded. The method makes use of a special configuration of the Ethernet switches in the components 111 (for example in the control units 111) of the network 110. As already described above, some or all of the components 111 (in particular at the node points of the network 110) have such Ethernet switches, which enable them to orient Ethernet data in a targeted manner inside the network 110. These Ethernet switches can be used for the purpose of guiding data to be logged via the existing Ethernet links 112 of the vehicle network 110 to a determined recording location (for example, to the OBD interface of the vehicle). I.e., it is proposed that the existing Ethernet network (i.e., in particular the Ethernet switches and the Ethernet links 112) be used not only for the data traffic in the vehicle, but rather simultaneously also for logging and debugging purposes.

Figure 2:
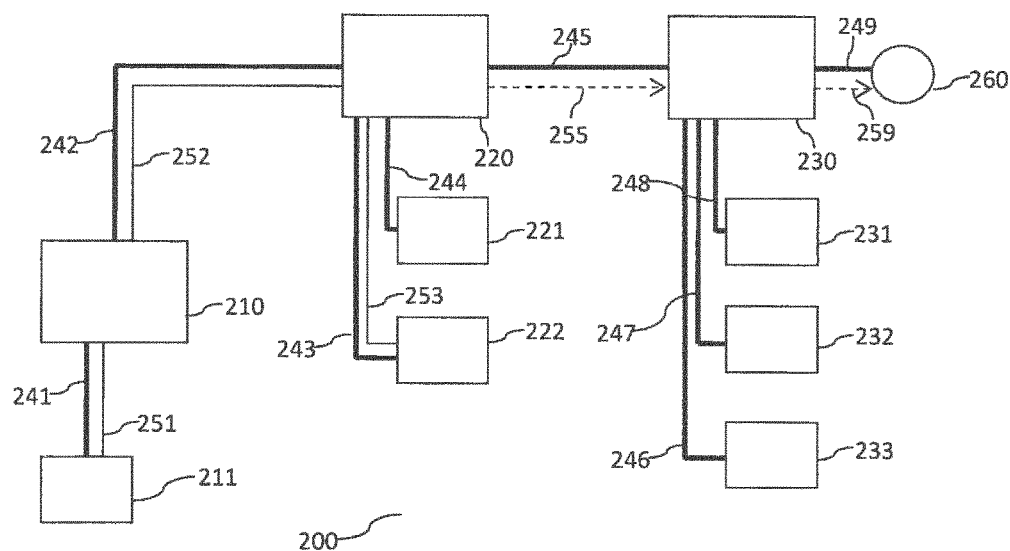
FIG. 2 shows an exemplary Ethernet network of a vehicle having a plurality of switches.

FIG. 2 shows an exemplary Ethernet network 200 (for example, the Ethernet network 110 from FIG. 1). The Ethernet network 200 can be, for example, a fast Ethernet (100 Mb/s) or a gigabit Ethernet (1000 Mb/s). The network 200 comprises a plurality of components 210, 211, 220, 221, 222, 230, 231, 232, 233 (e.g., sensors, actuators, and/or control units), which are connected to one another via various Ethernet buses (or Ethernet links) 241, 242, 243, 244, 245, 246, 247, 248. Some of the components 210, 220, 230 communicate directly with a plurality of other components of the network 200. These components 210, 220, 230 typically comprise Ethernet switches to be able to relay data between the respective directly connected components. These components 210, 220, 230 are referred to in this document as node components. Components 211, 221, 222, 231, 232, 233, which only occur as a transmitter or receiver, but have no relaying function, are referred to as end components. End components typically do not comprise Ethernet switches.

Furthermore, a data logger 260 is shown in FIG. 2, which is connected via an Ethernet interface 249 (for example, via the OBD interface of the vehicle) to the node components 230. This data logger 260 is to make it possible to access all data exchanged in the Ethernet network 200. However, typically only the data exchanged between the directly connected components 220, 231, 232, 233 are available at the node components 230. Data which are exchanged, for example, between the end components 211 and 222 (as shown by the lines 251, 252, 253) cannot be tapped at the node components 230.

It is proposed that the Ethernet switches contained in the node components 210, 220, 230 be configured so that a copy of the data which is sent, for example, from the end component 211 to the end component 222 (and/or vice versa) is conducted through the Ethernet network 200 to the node component 230 and can thus be registered using the data logger 260. This is shown in FIG. 2 by the dashed arrows 255, 259, which are to represent a side channel for logging data. This side channel is provided on the basis of the existing infrastructure in the network 200, i.e., on the basis of the existing Ethernet links 255, 259 and the existing switches in the node components 210, 220, 230. It is thus possible to provide and log all data exchanged in the Ethernet network 200 at an arbitrary point in the network 200.

Figure 3:
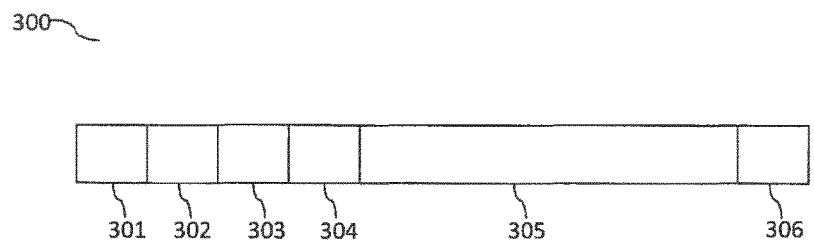
FIG. 3 shows the schematic structure of an exemplary Ethernet frame.

FIG. 3 shows the structure of an exemplary Ethernet frame 300. The data transmitted in the Ethernet network 110, 200 typically have the frame structure shown in FIG. 3. The Ethernet frame comprises header data 301, 302, 303, 304, payload data (also called useful data) 305, and error correction data 306 (frame check sequence, FCS). The header data comprise a target address 301 (media access control (MAC) address), which identifies the reception component (for example, the end component 222) in the Ethernet network 200. Furthermore, the header data comprise a source address 302, which identifies the transmission component (for example, the end component 211) in the Ethernet network 200. Furthermore, the header data can comprise a so-called VLAN tag (virtual local area network tag) 303, which can be used for the purpose of assigning Ethernet frame 300 to a specific class of data. For example, for the data class "debugging data", a determined debugging VLAN tag could be defined, which could be added to Ethernet frame 300, to identify the data contained therein as "debugging data". Finally, the header data can comprise a type field (the so-called ether type) 304. The type field provides information about which protocol of the next higher protocol layer is used by the useful data 305.

It is described hereafter how the Ethernet switches in the node components 210, 220, 230 of the Ethernet network 200 can be configured to be able to log data from selected components of the network 200 (for example, from selected control units (CU) of the vehicle) at a selected point (for example, at the node component 230) of the network 200.

The configuration of the Ethernet switches can be performed via diagnostic command (for example, according to a unified diagnostic services (UDS) standard such as the ISO 14229 standard). The one or more diagnostic commands can be transmitted, for example, via the OBD interface of the vehicle or via another diagnostic interface of the vehicle (for example, diagnosis CAN, tele-diagnosis, . . . ) to the Ethernet switches to be configured. In this case, the control units which contain the Ethernet switches to be configured are addressed via the system buses 112, 122, 132, 142 of the vehicle communication network 100.

The configuration of the Ethernet switches can also be performed via Ethernet control commands via arbitrary Ethernet interfaces of the vehicle (for example, the OBD interface, a WLAN (wireless local area network) interface, a UMTS (universal mobile telecommunication system) interface, etc.). The Ethernet switches are preconfigured such that it is ensured that the Ethernet control commands can be transported through the entire Ethernet network 200 (and in particular up to the Ethernet switches to be configured).

The configuration of the Ethernet switches (i.e., the generation and the transmission of the configuration commands) can be performed via external devices (for example, via a laptop, a tester, or a data logger 260) or via vehicle-internal control units (for example, via the head unit or the information and communication system of the vehicle).

The configuration of the Ethernet switches can be performed both statically and also dynamically reacting to specific vehicle or error states. A static configuration of the Ethernet switches can be used, for example, for the logging of the data of one or more determined control units (i.e., components of the network 200). On the other hand, the configuration of the Ethernet switches (and therefore the selection of the diverted and logged data) can be made dependent on a state of the vehicle or on the occurrence of an error. For example, the detection of a determined error situation can have the result that the Ethernet switches are configured such that the data which are required for an analysis of the determined error situation are diverted and conducted to the data logger.

The configuration of the Ethernet switches for the diversion and logging of determined data is to be performed such that the exchange of data required for the operation of the vehicle is not disturbed. In other words, even if an extra side channel 255, 259 is used for data logging, it should be ensured that the data traffic in the network 200 (in particular on an Ethernet link 245 on which a side channel 255 is configured) which is required for the operation of the vehicle remains undisturbed. This typically requires network comprehensive planning, which takes into consideration the topology of the network 200 and the operational data streams.

Network comprehensive planning can result, for example, in the definition of logging scenarios. Examples of logging scenarios are, for example, a scenario in which the entire data traffic of a control unit A 211 is transmitted to the data logger 260 at terminal B (for example, to a specific port of the Ethernet switch in the node component 230); or a scenario in which the entire data traffic between CU A 211 and CU B 222 is transmitted to the data logger 230 at terminal C; or a scenario in which all data packets on Ethernet link A 241 are transmitted to the data logger 260 at terminal B. I.e., scenarios can be defined which establish which data of the Ethernet network 200 are to be diverted, and to which point of the Ethernet network 200 these diverted data are to be transmitted for logging. The scenarios can comprise the configuration commands for the individual Ethernet switches, which enable an implementation of the respective scenario. The scenarios can be planned and defined such that a disturbance of the operational data traffic by the data logging is avoided.

The predefined scenarios can be introduced as prefinished SW modules into the control units, which contain Ethernet switches to be configured. These SW modules can be prepared, for example, by the vehicle manufacturer (i.e., knowing the Ethernet network topology and knowing the operational data traffic). These SW modules can be implemented as an SW unit in the meaning of the SW logistics and can be replaced independently in the scope of a flash update process (for example, to take into consideration a change of the operational data traffic or for error correction of the SW modules).

It is to be ensured by the configuration of an Ethernet switch for a determined logging scenario that the configured Ethernet switch produces a copy of specific data and/or relays specific data to a specific port of the switch. The configuration of such actions can be performed, for example, explicitly by specifying register values of the Ethernet switch. Furthermore, the configuration can be performed by configuration on the level of switch features (for example, port mirroring).

As already explained, on an Ethernet link 245, the normal operational vehicle data traffic and the additional logging/debugging traffic must typically divide the existing bandwidth of the Ethernet link 245. A scenario-based configuration of the Ethernet switch of the network 200 can be used for the purpose of ensuring that the additional logging/debugging traffic does not disturb the operational vehicle data traffic. Alternatively or additionally, influence of the normal operational vehicle data traffic by the logging traffic can be avoided by reserving a fixed bandwidth on the Ethernet link 245 (for example, 10% of the bandwidth) for data logging or ensuring via a QoS (quality of service) mechanism that the two types of traffic (i.e., the logging traffic and the operational vehicle data traffic) do not interfere with one another. The differentiation between normal operational vehicle data traffic and logging traffic can be performed on the basis of various Ethernet mechanisms (for example, VLAN tagging, double tagging, addressing). Therefore, a logical parallel side channel 255 can be reserved only for logging purposes.

It can be ensured by the generation of a side channel 255 that the logging traffic does not exceed a determined maximum transmission rate. If more logging data arise than can be transmitted via the side channel 255, the excess logging data can be discarded (by an Ethernet switch). If logging data (i.e., logging packets) are discarded because of overfilling of the side channel 255, this can be noted in the node component 220, which houses the transmitting switch of the side channel 255, as an error in the memory of the switch and/or can be transmitted in the logging data traffic as an additional (optionally cyclic) error status message. It is thus ensured that the data logger 260 is informed that determined logging data have been lost at a determined point in time.

By way of the configuration, in every Ethernet switch which lies on the transmission path between the origin of the logging data and the data logger 260, it is established in which direction the logging data packets should be relayed to reach the data logger 260. Multiple data loggers 260 can also be connected simultaneously at various points in the network 200. By way of the configuration of the Ethernet switches of the network 200, logging data can be relayed according to various criteria to one of the data loggers 260 in each case, to selectively record the logging data therein. For example, a copy of the streaming traffic of cameras of the vehicle could be transmitted to the data logger 260 at a free switch port of the iCam control unit (i.e., the control unit for an internal camera), while a copy of the control data traffic of the entire vehicle can be conducted to a data logger at the OBD interface, and/or while a copy of the internal status of the head unit is transmitted to a data logger via a WLAN interface. The use of a plurality of data loggers at a corresponding plurality of points in the Ethernet network 200 and the selective transmission of logging data to one of the plurality of data loggers in each case can be used for the purpose of reducing the load of the Ethernet network 200 by the additional logging data traffic.

On the basis of the switch configuration, it can be established in each switch which data packets are to be relayed to one of the data loggers 260. The selection of the data packets 300 can be performed in this case in an Ethernet switch on the basis, for example, of one or a combination of multiple ones of the following criteria:

target address (MAC address) 301 of the packet/frame 300;
sender address (MAC address) 302 of the packet/frame 300;
VLAN tag 303 of the packet frame 300;
IP address of the sender (for example, by use of a deep packet inspection (DPI) functionality of the Ethernet switch);
IP address of the receiver (for example, by use of a deep packet inspection (DPI) functionality of the Ethernet switch);
ether type 304 of the packet/frame 300;
protocol of the useful data 305 contained in the packet/frame 300;
selection of one or more complete Ethernet links 241;
properties of the packet/frame 300 detectable using DPI;

By way of the above-mentioned criteria, those packet/frames 300 in an Ethernet switch, which are relevant for the logging, can be identified. The Ethernet switch can be configured to provide the identified packets/frames 300 with a "marking" (for example, VLAN tag) which can be analyzed by the Ethernet switches, to thus simplify the guiding of the logging packets/frames 300 through the Ethernet network 200 up to the data logger 260. For example, the identified packets/frames 300 can be provided with a "debugging" VLAN tag, which is used by the Ethernet switches for the relaying to the data logger 260.

Alternatively or additionally to the normal operational data traffic in the Ethernet network 200, CU-internal data, which are otherwise not transmitted on the Ethernet data lines 241, can be output by the CU and relayed to the data logger 260. For this purpose, a specific mode in a relevant CU 211 or in multiple CUs 211, 222, which is/are to output internal data, can be activated via diagnostic command. The relevant CU 211 subsequently outputs items of internal status information and transmits these items of internal status information as Ethernet packets/frames 300 via the above-mentioned side channel 255 of the vehicle network 200 to the data logger 260. These items of status information can be identified as such (for example, by VLAN, ether type, protocol, etc.). The data placed on the side channel 255 can optionally receive a "marking" (for example, a determined VLAN tag, a protocol, a target address), which can be analyzed by the switches. It is thus possible to conduct the items of internal status information in a targeted manner through the network 200 and to identify them to the data logger 260 as "items of internal status information". Due to the transmission of items of CU-internal status information via the Ethernet network 200 of the vehicle, dedicated diagnostic interfaces on the CUs can be omitted, which reduces the costs for the CUs.

On the basis of the switch configuration, it can be established in each switch whether a determined logging packet 300, which passes multiple switches of the network 200, should be copied one time per passed switch. In this case, the entire route of the packet 300 through the network 200 can be tracked, since a copy of the logging packet 300 is transmitted from each Ethernet switch. On the other hand, the switches can be configured such that the determined logging packet 300 is only copied one time in the direction of data logger 260 in total, which results in a more bandwidth-efficient solution. These options can be implemented via configuration of the ingress/egress cues of the switches.

Various options for the recording (i.e., the logging) of the diverted data are described hereafter. The vehicle network 100, 200 can be used such that the data logger 260 is connected via an Ethernet interface 249 in the OBD plug of the vehicle and the data traffic to be recorded are conducted to the Ethernet interface 249 in the OBD plug. Therefore, no further interface is required in the vehicle for the recording of logging data.

The vehicle network 100, 200 can be used so that the data logger 260 is connected via an existing wireless Ethernet interface in the vehicle (for example, a WLAN and/or 3G and/or UTMS interface in an antenna module of the vehicle). The data traffic to be recorded can be redirected to such a wireless Ethernet interface. A remote diagnosis can thus be enabled. In particular, diagnostic data can thus be registered during the normal operation of the vehicle on the road and transmitted promptly to a data logger 260.

The vehicle network 100, 200 can be used such that the data logger 260 can be connected via a free switch port of an arbitrary control unit (for example, of the internal camera, iCam, control unit). The data traffic to be recorded can be conducted through the Ethernet network 200 to the selected switch port of the selected control unit. The vehicle network 100, 200 can be used such that the data logger 260 can be connected via an additional measurement interface ("logging adapter") and the data traffic to be recorded is redirected to the additional measurement interface.

Alternatively or additionally, the vehicle network 100, 200 can be used such that the data traffic to be recorded is redirected to a determined CU (i.e., to a determined component 211 in the Ethernet network 200) in the vehicle (for example, to the head unit/to the information and data communication system of the vehicle). The determined CU can comprise, for example, a storage medium (for example, a hard drive and/or a RAM memory). The data to be logged can then be recorded in the determined CU without the requirement of a dedicated data logger 260. In particular, current information and communication systems have internal storage media (for example, for storing audio/video/navigation data) and/or via a USB interface for the connection of external storage media. The internal storage medium and/or an external storage medium connected via USB could be used instead of a data logger 260 for recording the logging data. This results in a significant reduction of the costs for the logging of diagnostic data in a vehicle. In addition, the use of such an (internal or external) storage medium allows the possibility of recording diagnostic data in a simple manner during the normal operation of the vehicle (for example, in the scope of long-term studies).

The method described in this document for diverting and redirecting logging data through the Ethernet network 200 can also be applied to the data of other bus systems 120, 130, 140 of the vehicle communication system 100. If a CU which is connected to the Ethernet network 200 additionally also has access to one or more other vehicle bus systems (for example, a LIN (local interconnect network) bus, a CAN bus, etc.), the data which are received from this CU via another vehicle bus system can also be copied in the logging side channel 255 of the Ethernet network 200. The CU can be configured via diagnostic command to copy determined data from one of the other vehicle bus systems on the Ethernet logging channel 255. It can be established via diagnostic command which data are to be copied and/or to which target address the copied data are to be transmitted. For example, it can be defined to which of the possibly multiple data loggers 260 (data logger at OBD socket, data logger at WLAN antenna module, logging on head unit internal memory, data logger via "logging adapter", etc.) the data of another vehicle bus system are to be transmitted. The packets identified as relevant for the logging can optionally receive a "marking" (for example, VLAN tag, protocol, target address), which can be analyzed by the switches.

In other words, the components of the Ethernet network 200 can be configured such that they can tunnel data of another bus system 120, 130, 140 through the Ethernet network 200. For this purpose, determined components of the network 200, which also communicate with another bus system 120, 130, 140 (so-called gateway components) can be configured such that they copy all or selected data of the other bus system 120, 130, 140 as useful data 305 in one or more Ethernet packets/frames 300 and identify the one or more Ethernet packets/frames 300 such that (for example, on the basis of the header data 301, 302, 303, 304) they are conducted like logging data through the Ethernet network 200. For example, the gateway components 101 of the vehicle communication network 100 could be used to tunnel selected data from the bus systems 120, 130, 140 via the Ethernet network 110, 200 to a data logger 260.

The method described in this document can also be used for stimulation purposes. For stimulation purposes, in place of a (typically passive) data logger 260, a device for stimulation of control units in the vehicle network can be connected (for example, a notebook). A stimulation (for example, a query of status of a CU or the retrieval of a website of a CU) can then also be performed via the reserved side channel 255. The normal operational data traffic will therefore not be influenced by stimulation data. In order that the data traffic for stimulation of the switches of the network 200 is recognized as such, the stimulation data packets can be marked accordingly (for example, with a VLAN tag, and/or a specific protocol). This marking can optionally only be removed by the last switch before the target CU, so that the marking can be used in the network 200 for conduction purposes.

Figure 4:
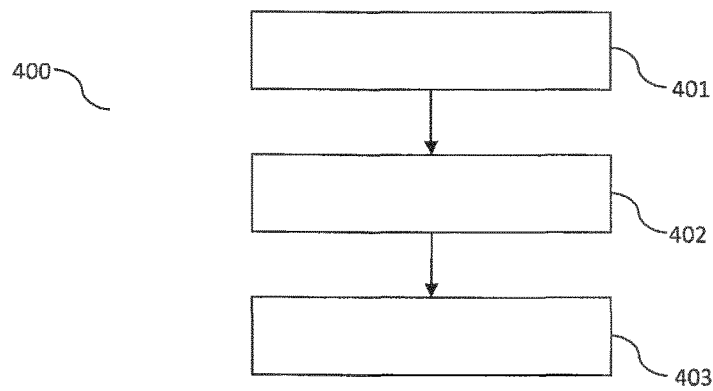
FIG. 4 shows a flow chart of an exemplary method for data logging in a vehicle.

FIG. 4 shows a flow chart of an exemplary method 400 for data logging in a vehicle. In particular, the method 400 shown in FIG. 4 is oriented to the recording of data which are transmitted from a transmitting control unit to a receiving control unit of a vehicle via a communication system 100, 200 of the vehicle. As shown in FIGS. 1 and 2, the communication system 100 comprises an Ethernet network 110, 200. In such an Ethernet network, data can be conducted from a transmission component 211 (which, for example, comprises the transmitting control unit or corresponds to the transmitting control unit) to a reception component 222 (which, for example, comprises the receiving control unit or corresponds to the receiving control unit) via a transmission path 241, 242, 243. The use of switches in the Ethernet network 200 has the result that the data conducted on the transmission path 241, 242, 243 are only available (i.e., can be tapped) at those components 211, 210, 220, 222 of the network 200 which lie on the transmission path. However, these data are not available at other components 230 of the network.

The method 400 is directed to providing the data at a logging component 230 of the Ethernet network 110, 200, which does not lie on the transmission path. For this purpose, the method 400 comprises the configuration of an intermediate component 220 of the Ethernet network 110, 200, which lies on the transmission path, to prepare a copy of the data as logging data (step 401) and transmitting it to the logging component 230 (step 402). Furthermore, the method 400 comprises the recording 403 of the logging data at the logging component 230.

A method for recording data in an automotive Ethernet network was described in this document. The described method uses the existing infrastructure of the automotive Ethernet network and thus enables the cost-effective recording of data (for example, of debugging data) in the vehicle. In particular, costs and expenditures can be reduced, which would be necessary for the integration of an infrastructure for data loggers in a vehicle (during the development, in the factory, and for the maintenance) for data recording in automotive Ethernet networks. Thus, for example, the installation of dedicated measurement technology for recording data of the automotive Ethernet network can be entirely avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for recording data, which are transmitted from a transmitting control unit to a receiving control unit of a vehicle via a communication system of the vehicle, wherein the communication system comprises an Ethernet network, wherein the data are conducted from a transmission component to a reception component of the Ethernet network via a transmission path, wherein the data are to be recorded at a logging component of the Ethernet network which does not lie on the transmission path, wherein the method comprises the acts of:
 configuring an intermediate component of the Ethernet network which lies on the transmission path to transmit a copy of the data as logging data to the logging component; and
 recording the logging data at the logging component; and further configuring the intermediate component to store or transmit an error message if the logging data cannot be transmitted to the logging component.

2. The method according to claim 1, further comprising the act of configuring one or more further components of the Ethernet network, which lie on a logging transmission path from the intermediate component to the logging component, to transmit the logging data to the logging component.

3. The method according to claim 1, wherein the intermediate component comprises an Ethernet switch and wherein said configuring further comprises:
configuring the Ethernet switch to prepare a copy of the data; and
configuring the Ethernet switch to provide the copy of the data with header data, which enable the transmission of the copy of the data through the Ethernet network to the logging component.

4. The method according to claim 3, wherein the header data comprise at least one of:
a MAC target address of the logging component, and
a VLAN tag, which identifies the copy of the data as logging data.

5. The method according to claim 3, wherein the copy of the data is prepared on the basis of a port mirroring function of the Ethernet switch.

6. The method according to claim 3, wherein the method further comprises:
configuring the Ethernet switch to transmit the logging data via a determined port to the logging component; and
configuring the Ethernet switch to reserve a predetermined transmission bandwidth of the determined port for the transmission of the logging data.

7. The method according to claim 1, wherein said configuring further comprises transmitting a configuration command to the intermediate component through the Ethernet network and/or through another bus system of the communication system.

8. The method according to claim 7, wherein the configuration command is in automotive diagnostic command according to the ISO 14229 standard.

9. The method according to claim 7, wherein the configuration command is transmitted from one of:
a data logger via an OBD interface of the vehicle,
a data logger via a port of a component of the Ethernet network,
a data logger via a wireless interface, or
an information and communication system of the vehicle.

10. The method according to claim 7, wherein the method further comprises checking an authentication of a transmitter of the configuration command.

11. The method according to claim 1, wherein
the logging component is part of an information and communication system of the vehicle, and
the logging data are recorded on a storage medium of the information and communication system.

12. The method according to claim 1, wherein
the logging component comprises a wireless interface, and
the logging data are transmitted via the wireless interface to a data logger.

13. The method according to claim 1, wherein the method further comprises the act of ascertaining a logging scenario, wherein the logging scenario identifies at least one of:
at least one component of the Ethernet network as a logging component,
one or more transmitting control units,
identifies one or more receiving control units, and
message types to be recorded on the basis of header data, wherein the logging scenario further specifies configuration parameters for one or more intermediate components.

14. The method according to claim 13, wherein the method further comprises the act of detecting a predefined state of the vehicle, and wherein the ascertainment of the logging scenario is performed on the basis of the detected state of the vehicle.

15. The method according to claim 1, wherein
the transmitting control unit is connected to a different bus system of the communication system than the Ethernet network,
the transmission component is configured to receive all data transmitted from the transmitting control unit via the other bus system, and
the method further comprises the configuration of the transmission component to transmit a copy of at least a part of the data transmitted from the transmitting control unit via the other bus system to the logging component.

16. The method according to claim 1, wherein the method further comprises the acts of:
transmitting a control unit configuration command to the transmitting control unit;
configuring the transmitting control unit on the basis of the control unit configuration command, to transmit items of internal status information of the transmitting control unit as status data; and
configuring the transmission component to transmit the status data to the logging component.

17. A method for transmitting stimulation data via a communication system of a vehicle to a receiving control unit of the vehicle, such that the receiving control unit considers the stimulation data to be data which were transmitted from a transmitting control unit of the vehicle, wherein the communication system comprises an Ethernet network, wherein data from the transmitting control unit to the receiving control unit are conducted from a transmission component to a reception component of the Ethernet network via a transmission path, wherein the stimulation data are transmitted from a stimulation component, wherein the method comprises the act of:
configuring an intermediate component of the Ethernet network, which lies on the transmission path, to modify header data of the stimulation data received from the stimulation component and transmit the modified stimulation data to the reception component, wherein the modification of the header data comprises at least one of:
removing or modifying a VLAN tag, which identifies the received stimulation data as stimulation data, and
replacing a MAC origin address with the MAC address of the transmission component.

18. A method for transmitting stimulation data via a communication system of a vehicle to a receiving control unit of the vehicle, such that the receiving control unit considers the stimulation data to be data which were transmitted from a transmitting control unit of the vehicle, wherein the communication system comprises an Ethernet network, wherein data from the transmitting control unit to the receiving control unit are conducted from a transmission component to a reception component of the Ethernet network via a transmission path, wherein the stimulation data are transmitted from a stimulation component, wherein the method comprises the act of:

configuring an intermediate component of the Ethernet network, which lies on the transmission path, to modify header data of the stimulation data received from the stimulation component and transmit the modified stimulation data to the reception component;
configuring the intermediate components to conduct data transmitted from the transmitting control unit to a logging component; and
configuring the intermediate component to replace the data transmitted from the transmitting control unit with the stimulation data.

\* \* \* \* \*